(12) United States Patent
Fiacco

(10) Patent No.: US 6,514,304 B2
(45) Date of Patent: Feb. 4, 2003

(54) AIR FILTERING DEVICE WITH ROTATABLE RINGS AND FILTRATION MEDIA

(76) Inventor: Paul Fiacco, 1134 Armstrong Ct., Derby, KS (US) 67037-6282

(*) Notice: Subject to any disclaimer, the term of this patent is extended or adjusted under 35 U.S.C. 154(b) by 0 days.

(21) Appl. No.: 10/068,912

(22) Filed: Feb. 8, 2002

(65) Prior Publication Data

US 2002/0069626 A1 Jun. 13, 2002

Related U.S. Application Data

(63) Continuation of application No. 09/428,810, filed on Oct. 28, 1999, now Pat. No. 6,372,005, which is a continuation-in-part of application No. 08/953,598, filed on Oct. 17, 1997, now Pat. No. 6,004,365.

(51) Int. Cl.[7] .......................... B01D 45/12; B01D 33/00
(52) U.S. Cl. ........................ 55/400; 55/471; 55/473
(58) Field of Search ............................. 55/400, 385.2, 55/467, 471, 472, 473; 416/146 R

(56) References Cited

U.S. PATENT DOCUMENTS 4,849,862 A * 7/1989 Diskin et al. ............... 362/218
4,908,050 A    3/1990 Nagashima et al.
5,395,410 A    3/1995 Jang
6,004,365 A   12/1999 Fiacco

FOREIGN PATENT DOCUMENTS

| CH | 594 439   | 1/1978 |
|----|-----------|--------|
| DE | 37 02 765 | 8/1988 |
| DE | 39 22 772 | 1/1991 |
| WO | 94 08142  | 4/1994 |

* cited by examiner

Primary Examiner—Robert A. Hopkins
(74) Attorney, Agent, or Firm—Shook, Hardy & Bacon L.L.P.

(57) ABSTRACT

A ceiling fan having a rotatable plate. A filtering media is disposed proximate the peripheral edge of plate and rotatable therewith. A number of curved fan blades are coupled with and extend from the plate, and are disposed annularly to define a central opening so that air is pulled toward the blades and through the filter media. In another embodiment, a ceiling fan has a circular plate with a number of fan blades attached to the plate and arranged in a ring shape. The circular plate has a number of spacers that are coupled with a lower ring. At least one section of filter media is located between the plate and the ring. Also, at least one door is coupled with the plate and is located at the peripheral edges of the plate and ring to cover at least a section of the filter media.

6 Claims, 13 Drawing Sheets

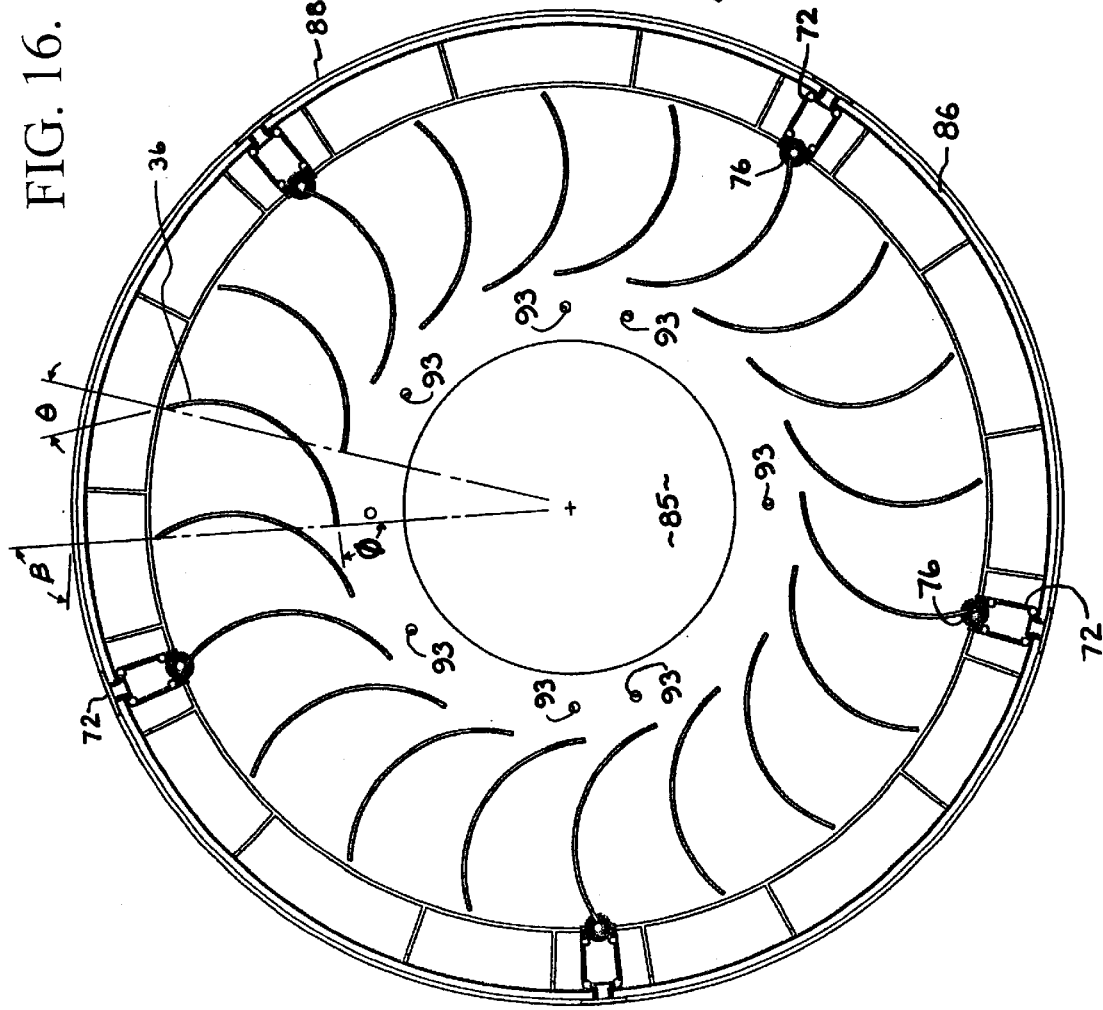

AIR FILTERING DEVICE WITH ROTATABLE RINGS AND FILTRATION MEDIA

The present application is a continuation of U.S. Ser. No. 09/428,810, filed on Oct. 28, 1999, now U.S. Pat. No. 6,372,005, issued on Apr. 16, 2002, which is a continuation-in-part of application U.S. Ser. No. 08/953,598, filed Oct. 17, 1997, now U.S. Pat. No. 6,004,365, issued on Dec. 21, 1999.

BACKGROUND OF THE INVENTION

1. Field of the Invention

This invention relates to air filters. In particular, this invention relates to air filters incorporating filtering media and a centrifugal fan, the centrifugal fan preferably being attachable to the rotor plate of a common ceiling fan. The invention also relates to an industrial embodiment attachable to a rotary motor.

2. Description of the Related Art

Air in homes or in business workplaces typically includes a colloid suspension of smoke particles, plant pollens, mold spores, and dust particles. Pollen and mold spores suspended in the air of a home or a workplace are common allergens which may cause sinusitis or hayfever, and other respiratory ailments. Dust suspended in the air may be harmful to persons in a home or workplace who have emphysema or asthma. Additionally, airborne smoke and dust tends to discolor and soil items in a home or workplace such as curtains and furniture. In the workplace, the dangers of pollutants in the indoor environment are oftentimes more harmful. For instance, the fumes emitted from cleaning solvents, hydrocarbons, acids and paint may cause serious long term health risks. Thus, it is widely seen as desirable to create home and workplace environments whose air is substantially free of airborne smoke, pollen, mold spores, dust and other harmful pollutants.

Several types of apparatus for cleaning and filtering air within a home or workplace are known. Many have disadvantages. For example, free standing electric air cleaning machines, typically incorporating an air impeller and a filtering medium mounted in the path of air flow, take up useable space within a room and typically create undesirable background noise. Another air filtering device having disadvantages is a carbon filter or an electrostatic air filter which is installable as an auxiliary element of a building's central air and heating system. Such systems are mechanically complex, and are expensive to construct, maintain, and operate.

The instant inventive air filtering device overcomes such disadvantages, among others, by providing a mechanically simple air filter which is economical to construct and operate, which takes up virtually no living or working space of a home or workplace, and which creates virtually no background noise. Such benefits are obtained through the provision of a centrifugal fan having a filtering media attached thereto and disposed therearound, the centrifugal fan and filtering media assembly being attachable to and rotatable by the rotor plate of a common ceiling fan, such ceiling fan having its fan blades removed. In another embodiment, the air filtering media is disposed at the periphery of a plate. The filtering media is secured in a compartment defined between the plate and a cover. Additionally, a larger, industrial embodiment may be attached to and rotatable by a more powerful rotary motor.

Prior Art Patents U.S. Pat. No. 4,849,862 issued Jul. 18, 1989, to Diskin, et al., discloses a ceiling suspended air purifying light fixture.

U.S. Pat. No. 4,750,863 issued Jun. 14, 1988, to Scoggins discloses a fan shroud filter.

U.S. Pat. No. 4,450,756 issued May 29, 1984, to Kling discloses a fume exhaust device.

U.S. Pat. No. 4,840,650 issued Jun. 20, 1989, to Matheme discloses a ceiling fan filter.

U.S. Pat. No. 4,422,824 issued Jun. 27, 1983, to Eisenhardt discloses a germ killing ceiling fan.

U.S. Pat. No. 4,790,863 issued Dec. 13, 1988, to Nobiraki discloses an air cleaner incorporating a centrifugal fan.

U.S. Pat. No. 5,443,625 issued Aug. 22, 1995, to Schaffhausen discloses an air filtering fixture.

U.S. Pat. No. 4,676,721 issued Jun. 30, 1987, to Hardee discloses a ceiling fan air cleaner.

None of the above disclosed patents disclose, teach or describe the novel, inventive, useful and unique characteristics and features of the present inventive air filtering device.

BRIEF SUMMARY OF THE INVENTION

The present inventive air filtering device comprises an upper circular plate, preferably between three and four feet in diameter, the circular plate being adapted for fixed attachment to and rotation by the rotor plate of a common ceiling fan; such ceiling fan having its blades removed.

Upon removal of the fan blades of, for example, a common four bladed ceiling fan, screw receiving fan blade attachment apertures of the ceiling fan's rotor plate are exposed. Typically, the lower surface of such rotor plate is elevated above the lower surface of the ceiling fan's motor housing. The upper circular plate of the present inventive air filtering device preferably extends conically upward, such upward extension terminating in a flattened circular upper end which is fitted for attachment to the rotor plate of the ceiling fan. Screw receiving filter attachment apertures are either drilled into or molded into the flattened upper end of the circular plate, such apertures being positioned and aligned so that they may underlie the fan blade attachment apertures of the ceiling fan's rotor plate. Also, a light fixture shaft aperture maybe drilled or molded into such flattened open end. Such configuration of the upper circular plate and the filtering attachment apertures allows the air filtering device to be easily and conveniently attached to the rotor plate by means of screws or bolts.

A multiplicity of fan blades are fixedly attached to or molded as a part of the lower surface of the circular plate so that they extend downwardly therefrom; the fan blades being radially configured and aligned in conformity with the common configuration of the blades of a centrifugal fan or pump. Upon operation of the ceiling fan motor to rotate the upper circular plate along with the blades extending therefrom, the blades centrifugally accelerate air outwardly in all radial directions.

Lower structural support of the blades is preferably provided by an annular ring which is molded as a part of or fixedly attached to the lower outside corners of the blades. Preferably, the annular ring presents an outwardly facing peripheral surface extending annularly around the outer edges of the fan blades. The outwardly facing peripheral surface preferably has a snap ridge receiving channel extending annularly therearound; the snap ridge receiving channel serving the function of securely and interchangeably holding a cylindrical air filter retaining frame containing an air filtering medium.

The air filter retaining frame preferably comprises a plastic downwardly opening U-channel ring, and a plastic upwardly opening U-channel ring, the U-channel rings preferably being interconnected by a pair of concentric cylindrical wire mesh walls. Preferably, the upper and lower edges of the wire mesh walls are respectively embedded within and held by the lower and upper surfaces of the U-channel rings. The combination of the upper and lower U-channel rings, and the concentric wire mesh walls define a cylindrical filtering medium retaining and supporting space. Within such space, any of several air filtering media may be deposited. Suitable air filtering media which may be deposited within such cylindrical space are activated charcoal, a pleated fiberglass mesh, pleated woven fabric filters either chemically treated or impregnated with activated charcoal, high efficiency particle arresting (HEPA) filters, or continuations of such filtering media.

A snap ridge is preferably molded as a part of the lower U-channel ring so that the snap ridge extends inwardly from such ring's inwardly facing surface. Preferably, the filter retaining frame is closely fitted to the fan blades so that it may be slidably mounted over the outer edges of the fan blades, and so that it may be manually pressed into place, causing the snap ridge to snap into place within the snap ridge receiving channel of the annular ring. Removal and replacement of the air filter retaining frame is conveniently accomplished by manually pulling the air filter retaining frame downwardly, away from the blades, causing such frame to slide away from the fan blades. An opposite upward sliding motion imposed upon a new air filtering frame containing a fresh air filter medium replaces the removed air filter retaining frame.

In operation, upon rotation of the assembled air filtering device by the motor of a ceiling fan, air is drawn upward into the interior space of the air filtering device, and the air is centrifugally accelerated outward in all radial directions by the fan blades. The air then flows through the air filter retaining frame and through the air filtering medium contained therein. Such flow of air accomplished continuous and noiseless filtration of the air, and accomplishes desirable air circulation.

In the alternative embodiments of the air filtering device, the air filtering media is held between an upper plate coupled with the rotary motor and a cover. The filtering media compartment or compartments are further defined by the fan blades forcing air through the media and removable doors on the outside of the media near the periphery of the device. In one alternative embodiment, the doors are slidably received within slits positioned around the periphery of the plate. In the other embodiment, the doors are pivotably connected to the device at spacers securing the cover to the plate. Furthermore, in the alternative embodiments, the blades are progressively curved so that the angle of the blades is more tangential at the inner edge than the outer edge of each blade.

Accordingly, it is an object of the present invention to provide an air filtering device which is readily installable upon the rotor plate of a common ceiling fan; such ceiling fan having its fan blades removed.

It is a further object of the present invention to provide such an air filtering device which utilizes centrifugal fan blades for accelerating the air.

It is a further object of the present invention to provide such an air filtering device further having an air filter retaining frame containing an air filtering medium, such frame being annularly mounted around the outer periphery of the centrifugal fan blades.

It is a further object of the present invention to provide such an air filtering device further providing a snap ridge and a snap ridge receiving channel for easy installation, removal, and replacement of the air filter retaining frame.

It is a further object of the present invention to provide such an air filtering device which is economically constructed, and which is quiet in operation.

It is a further object of the invention to provide an air filtering device having filtering media compartments between the upper plate and lower cover that remove particulates from the air.

It is a further object of the present invention to provide an air filtering device with doors covering the air filtering media that are easy to open and secure to replace the filtering media.

A still further object of the present invention is to provide an air filtering device that moves a large quantity of air and has great durability for filtering air laden with destructive properties in industrial environments.

A further object of the invention is to provide an air filtering device that forces air through the filtering media at high enough velocity to use a variety of types of filtering media.

Another object of the present invention is to provide an air filtering device having a plurality of centrifugal fan blades shaped to pull air axially towards the device and through the filtering media.

Other and further objects, benefits, and advantages of the present inventive air filtering device will become known to those skilled in the art upon review of the Detailed Description which follows, and upon review of the appended drawings.

BRIEF DESCRIPTION OF THE DRAWINGS

The objects and features of the invention noted above are explained in more detail with reference to the drawings, in which like reference numerals denote like elements, and in which:

FIG. 16 is a bottom plan view of the plate demonstrating the curvature of the blades of the device.

FIG. 17 is an enlarged fragmentary view of one of the legs of the plate.

DETAILED DESCRIPTION OF THE PREFERRED EMBODIMENT

Figure 1:
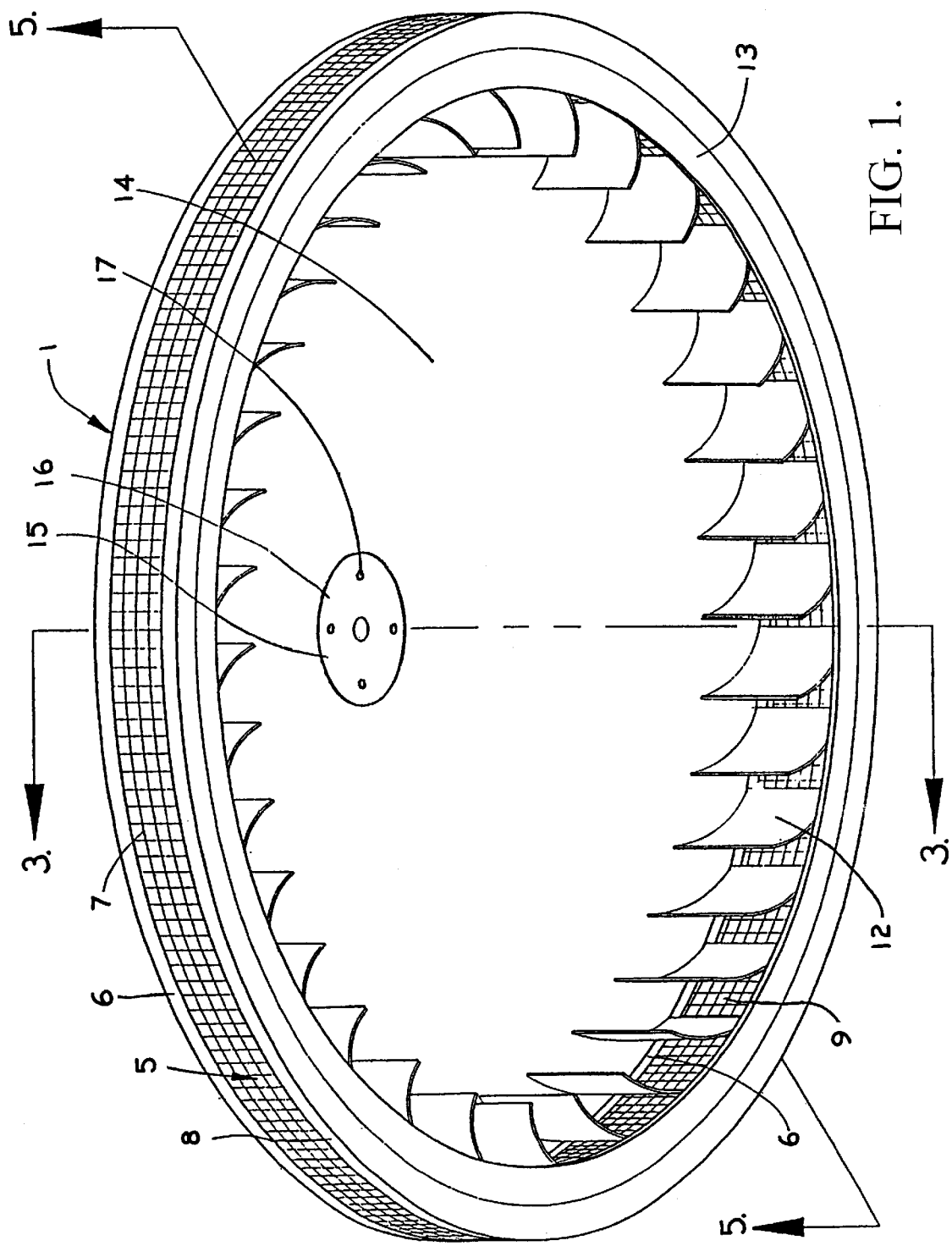
FIG. 1 is an isometric view of the air filtering device, viewed from below.
Figure 2:
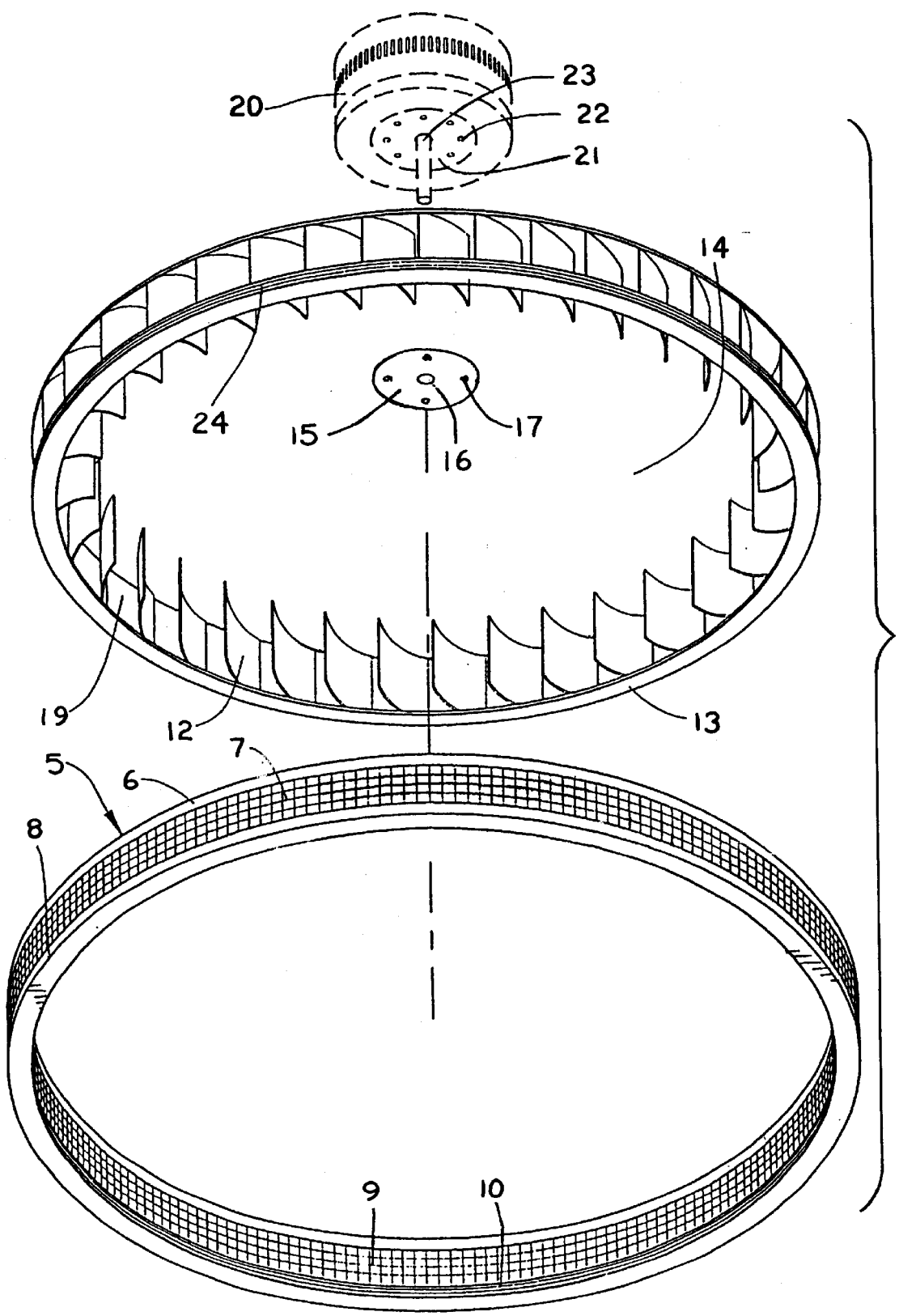
FIG. 2 is an exploded isometric view of the air filtering device, viewed from below.

Referring now to the drawings, and in particular to FIG. 2, the fan blades of a common ceiling fan (not shown) are removed from the ceiling fan's motor 20, exposing a ceiling fan rotor plate 21, and screw receiving fan blade attachment apertures 22. A light fixture (not shown) attached to the ceiling fan is also removed, exposing a light fixture attachment shaft 23. Upon removal of such light fixture and ceiling fan blades, the ceiling fan is ready for installation of the air filtering device which, referring to FIG. 1, is referred to generally as drawing element 1.

Figure 3:
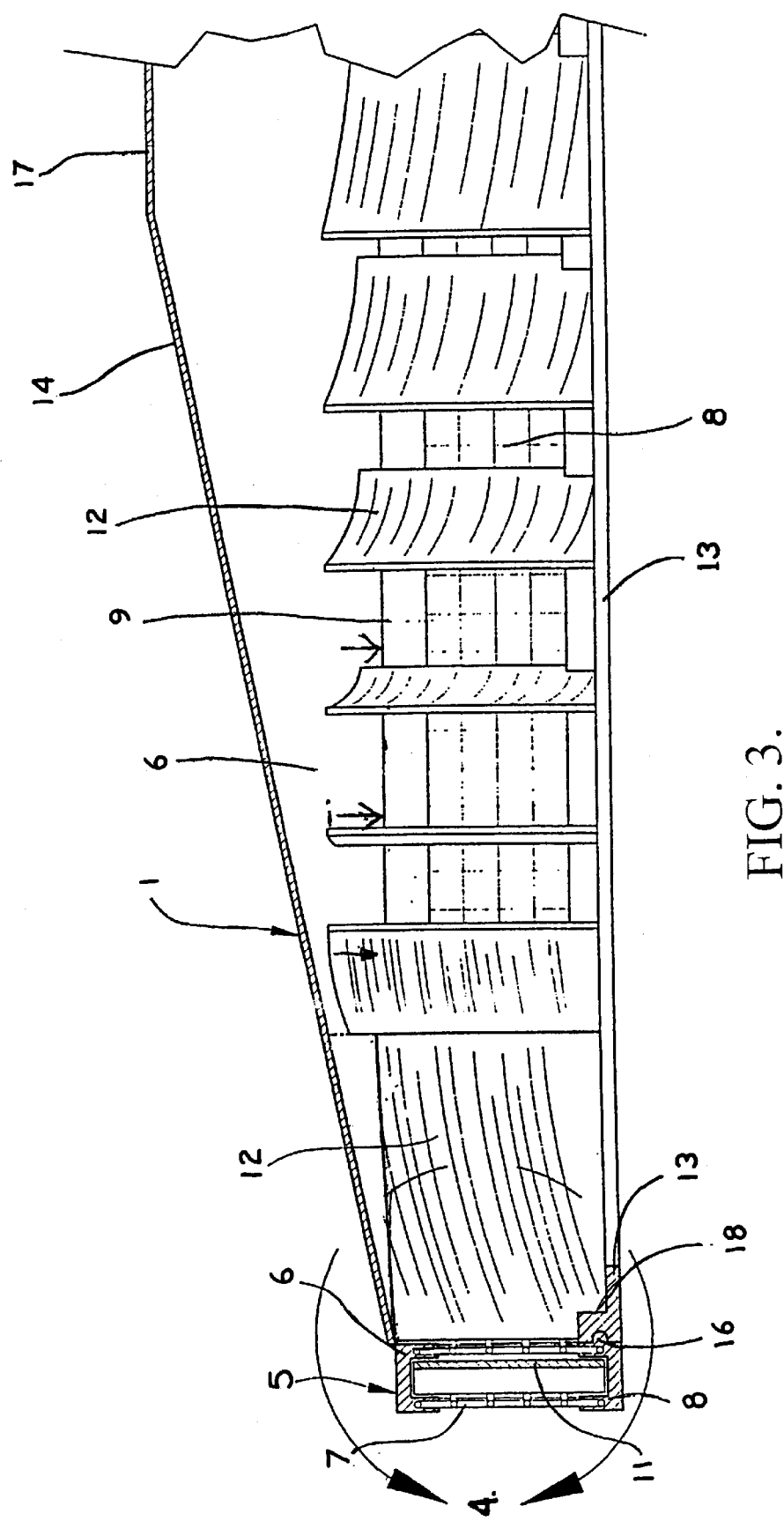
FIG. 3 is a partial sectional view of the air filtering device; the sectional plane being vertical, passing diameterally through the device.

Referring simultaneously to FIGS. 1 and 3, the upper circular plate 14 of the air filtering device 1 is preferably between three and four feet in diameter. Preferably, the upper circular plate 14 extends conically upward terminating in a flattened circular area 15, such area being fitted for flush mounting against, referring to FIG. 2, the rotor plate 21 of the ceiling fan. Referring to FIG. 3, the upward slope of the conical section may commence (as shown) at the outer periphery of the upper circular plate 14 or, alternately, such slope may commence at the inner edges of the fan blades 12. The flattened circular area 15 preferably has four screw receiving air filter attachment apertures 17 and a central light fixture attachment aperture 16. Where the rotor plate 21 is adapted for attachment of five ceiling fan blades, five air filter attachment apertures in a pentagonal configuration are utilized. Upon attachment of the circular plate 14 to, referring to FIG. 2, the rotor plate 21, by means of screws passing through the screw receiving apertures 17 and 22, the circular plate 14 may be rotatably driven by the ceiling fan motor 20. A light fixture (not shown) may be reinstalled upon the light fixture attachment shaft 23 which extends through the light fixture receiving aperture 16.

Referring again to FIG. 1, thirty-four curved fan blades 12 extend vertically downward from the lower surface of the upper circular plate 14. Depending upon the overall diameter of the air filtering device, a greater or a lesser number of fan blades may be utilized. Each fan blade 12 is outwardly arcuately curved and is tilted in the direction of normal rotation for added efficiency in radial acceleration of air.

Figure 4:
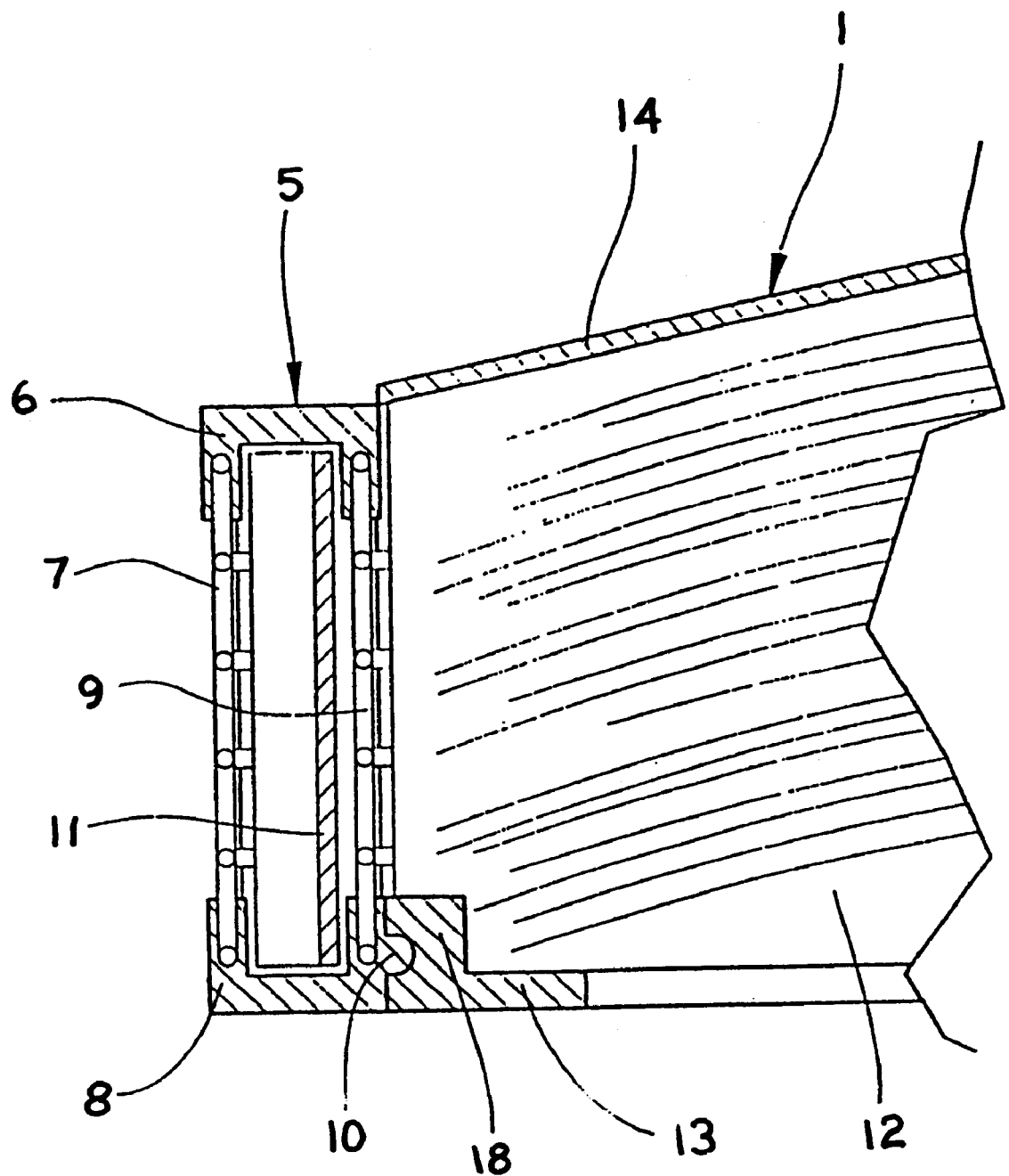
FIG. 4 if a magnified view of a portion of FIG. 3.
Figure 5:
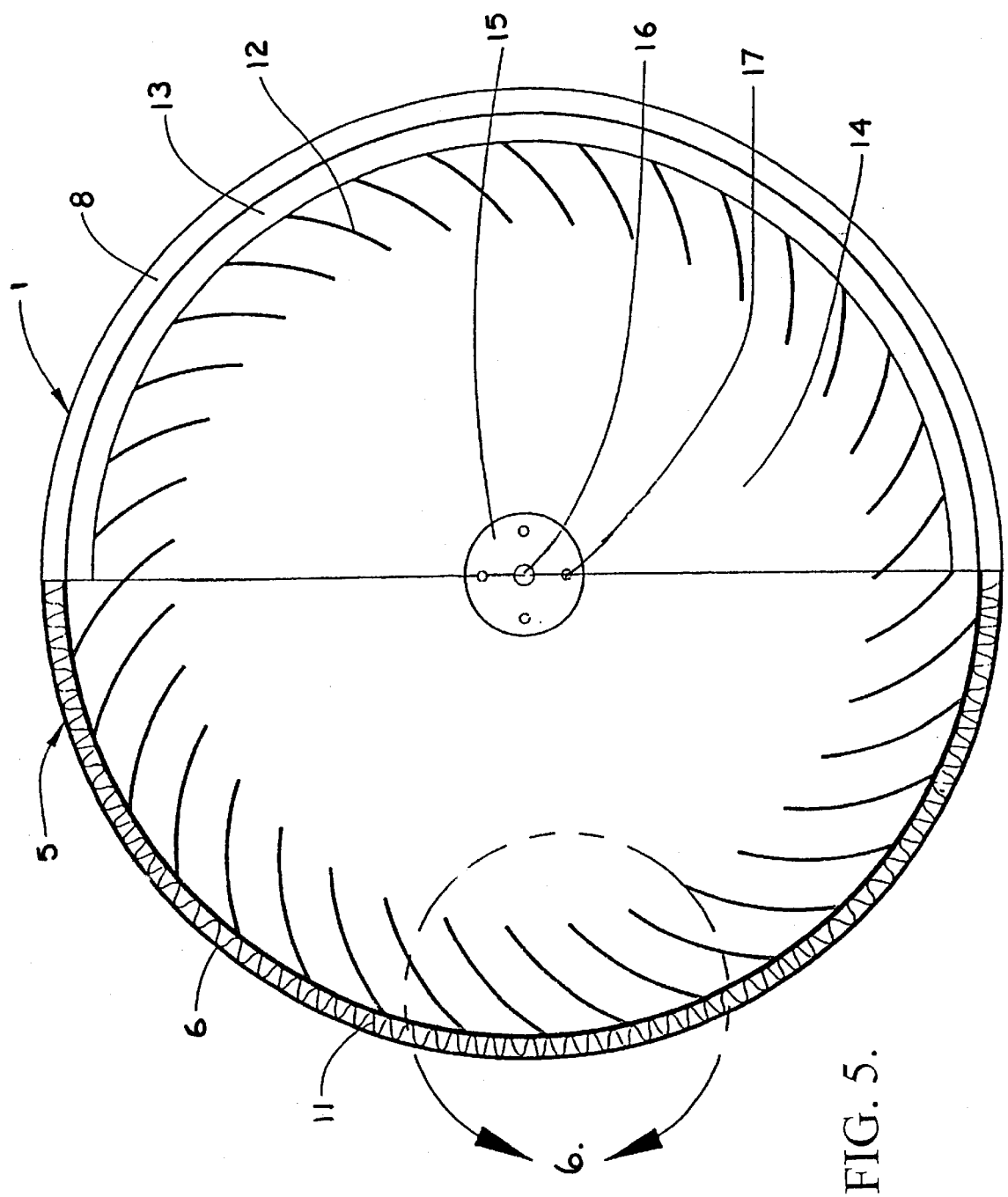
FIG. 5 is a plan, partially sectional, view of the air filtering device, viewed from below; the plane of the section passing horizontally through such device.

Referring simultaneously to FIGS. 1 and 4, the lower outer edges of the fan blades 12 are structurally supported by a support ring 18 having an inwardly extending annular flange 13, the lower outer edges of the fan blades 12 preferably being homogeneously fused with the inner surfaces of the support ring 18, and fused with the inner surfaces of the support ring 18, and fused with the upper surface of the annular flange 13. Referring simultaneously to FIGS. 2 and 4, the outwardly facing peripheral surface of the support ring 18 preferably has a snap ridge receiving channel 24 extending annularly therearound.

Referring to FIG. 1, drawing element 5 refers generally to an air filter retaining frame containing a filtering medium. Referring to FIG. 2, the snap ridge receiving channel 24 serves the function of holding in place the air filter retaining frame and air filter 5. Referring simultaneously to FIGS. 1 and 4, the air filter retaining frame and air filter 5 comprise a downwardly opening U-channel ring 6 and an upwardly opening U-channel ring 8. A pair of concentric air permeable wire grids 7 and 9 span between and interconnect the U-channel rings 6 and 8; the U-channel rings 6 and 8 and the wire grids 7 and 9 defining an interior cylindrical space for containing an air filtering medium 11. The air filtering medium 11 as depicted is a pleated fiberglass mesh. Other suitable air filtering media are: activated charcoal, pleated woven fabric filters which are either chemically treated or impregnated with activated charcoal, high efficiency particle arresting (HEPA) filters, or combinations of such filters.

Referring simultaneously to FIGS. 2 and 4, a snap ridge 10 extends inwardly from the inwardly facing surface of the lower U-channel ring 8, the snap ridge 10 being fitted for retention by the snap ridge receiving channel 24.

Figure 6:
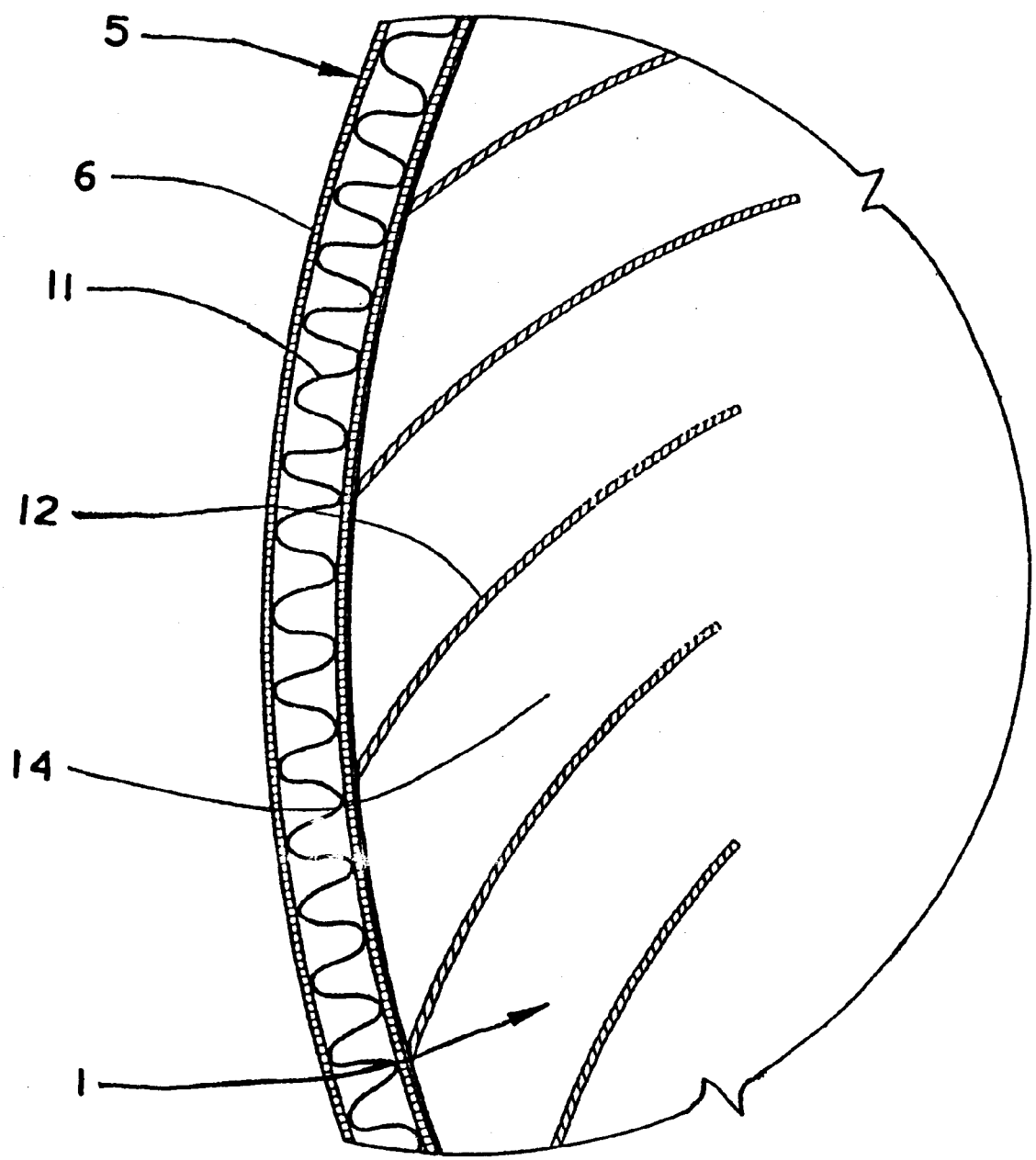
FIG. 6 is a magnification of a portion of FIG. 5.

Referring to FIG. 2, in operation of the air filtering device, the ceiling fan motor 20 is operated to rotate the upper circular plate 14 and the fan blades 12 in a clockwise fashion. Upon such rotation, air is accelerated radially outward through the openings 19 between the fan blades 12. Referring to FIG. 1, the air then passes through the air filtering retaining frame 5, and, referring to FIG. 6, through the air filtering medium 11 contained therein. As the air passes through the air filtering medium 11, the air is filtered and cleaned.

Preferably, the circular plate 14, the fan blades 12, the supporting 18, and the flange 13 are formed through a plastic injection molding process. Also preferably, referring to FIG. 4, the upper and lower U-channel rings 6 and 8 are formed through a plastic injection molding process.

Referring to FIG. 1, the air filtering device 1 provides advantages of economy in construction. The circular plate 14, the fan blades 12, and the support ring 18 may be economically constructed from injection molded plastic. The air filter retaining frame 5, along with filtering media contained therein may be inexpensively constructed allowing for economic disposal and replacement. The air filtering device 1 also economically saves power allowing a single electric motor to provide room air flow and air filtration. The air filtering device 1 further provides economy in space usage; taking up virtually no living or working space where it is installed and used. The air filtering device 1 additionally enhances the overall atmosphere of a room where it is installed and used by circulating and filtering the air while generating virtually no background noise.

Figure 7:
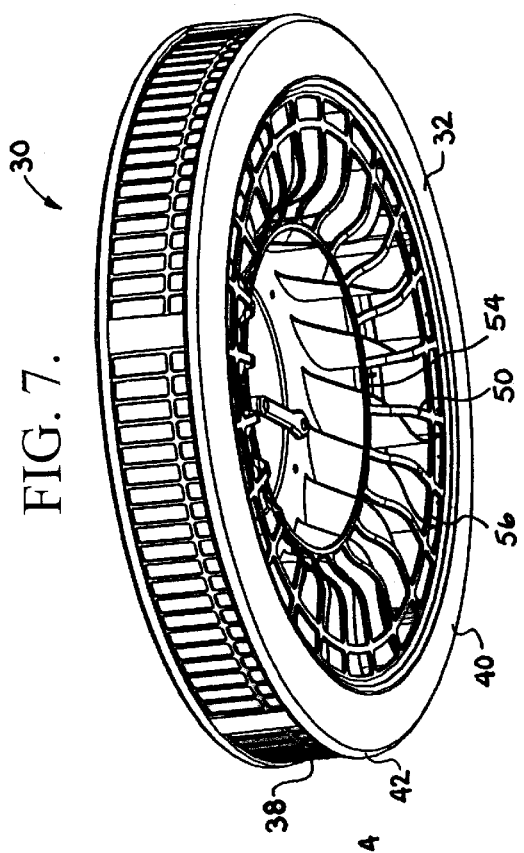
FIG. 7 is an isometric view of an alternative embodiment of an air filtering device, viewed from below.
Figure 8:
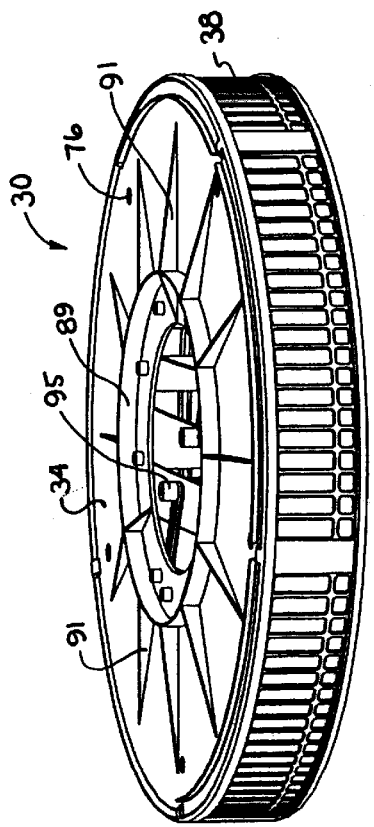
FIG. 8 is an isometric view of the air filtering device of FIG. 7, viewed from above.
Figure 9:
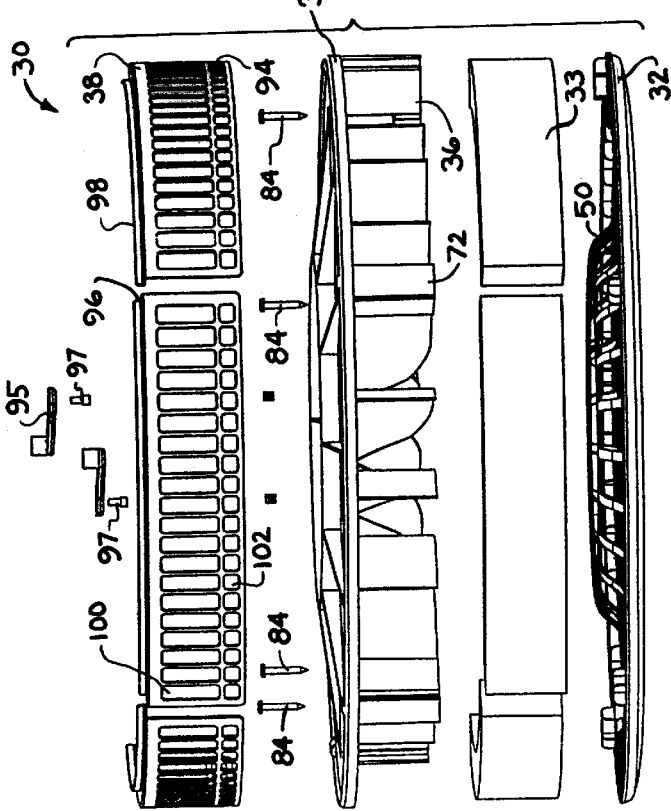
FIG. 9 is an exploded, isometric view of the air filtering device of FIG. 7.

Referring to FIGS. 7 and 8, an alternative embodiment of the present invention is shown and is designated generally by the numeral 30. With reference to FIG. 9, the device 30 includes a cover 32, a plurality of segments of air filtering media 33, a plate 34 having a plurality of fan blades 36, and a number of doors 38. Preferably, the outer diameter of plate 34 and cover 32 is 29 inches.

Figure 11:
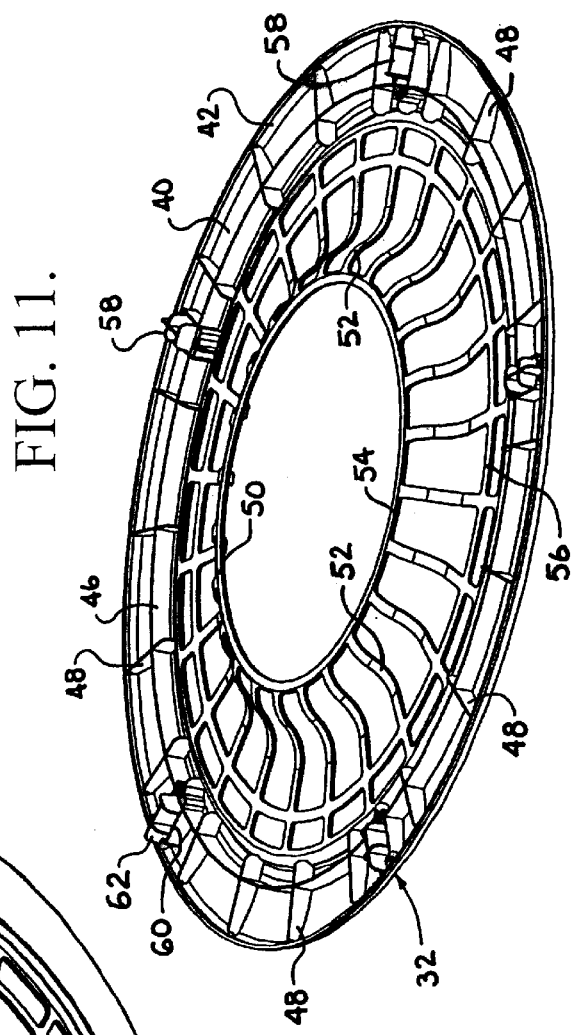
FIG. 11 is an isometric view of the cover, viewed from above.
Figure 10:
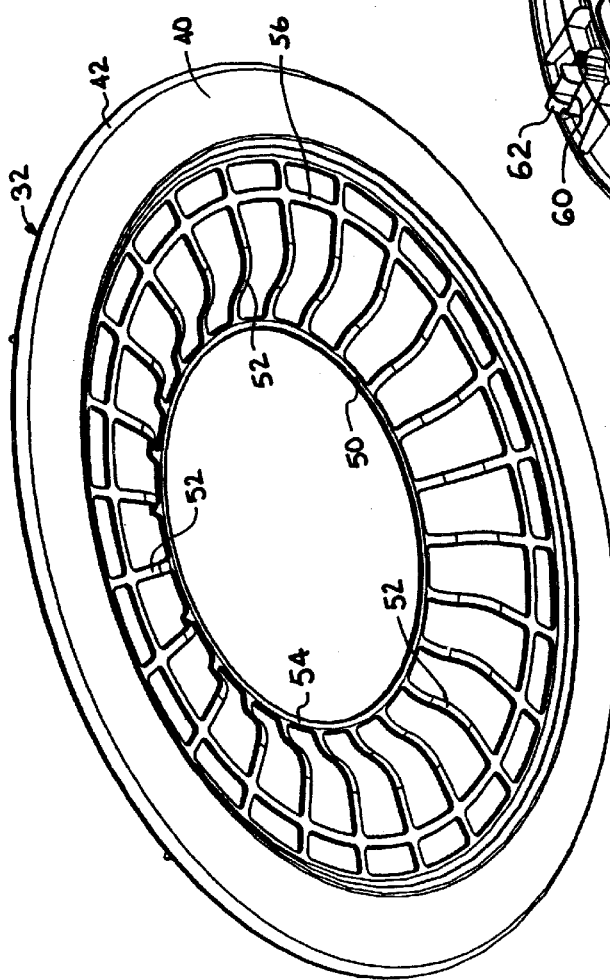
FIG. 10 is an isometric view of the cover of the air filtering device of FIG. 7, viewed from below.
Figure 12:
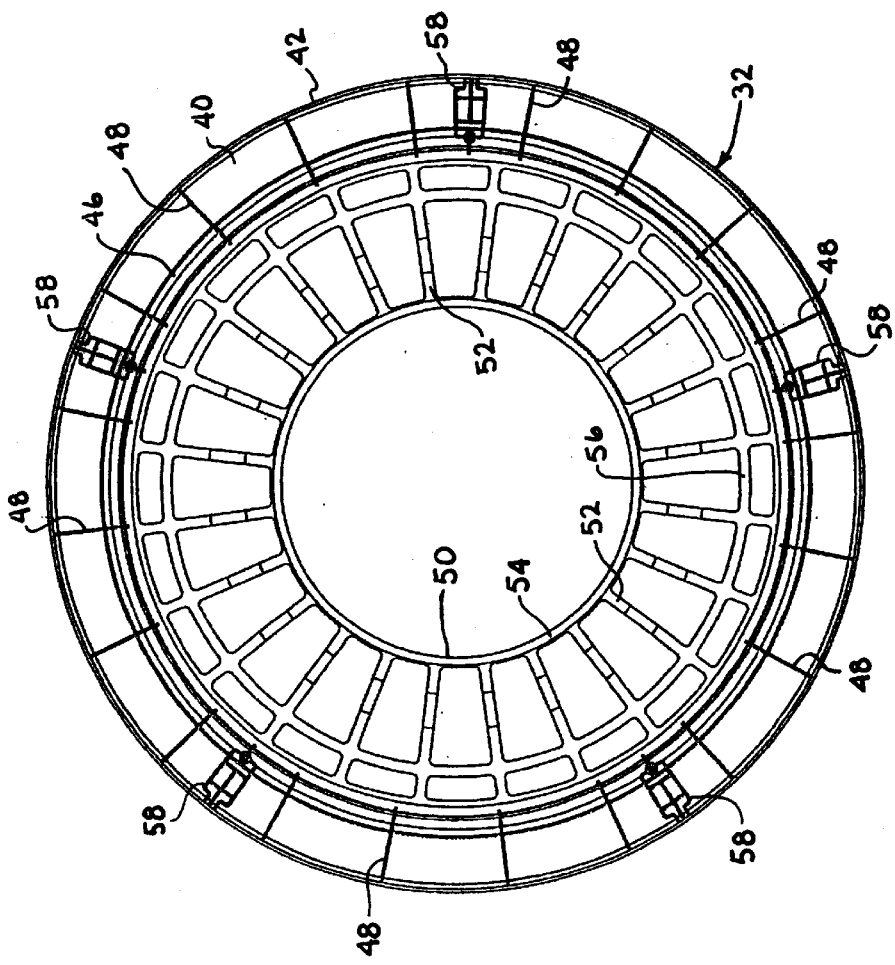
FIG. 12 is a top plan view of the cover.

As shown in FIG. 10, the cover 32 has an annular support ring 40 and an upstanding flange 42 disposed around the outer peripheral edge of the ring. With reference to FIGS. 11 and 12, a circumferential support ridge 46 and a plurality of radially oriented support ribs 48 are formed on the annular support ring 40. The ribs 48 and ridge 46 are approximately the same height as flange 42. The ribs 48 originate at flange 42 and terminate at the inner diameter of ring 40. Preferably, the ribs 48 are integrally formed with the support ridge 46 and intersect with the ridge at substantially normal angles. The support ridge and ribs provide strength and support to the cover without adding additional weight to the device.

At the inner diameter of the ring 40, a decorative screen 50 is coupled with ring 40 of the cover. The screen 50 is comprised of a plurality of spokes 52 extending from the inner diameter of the ridge 46 and terminating at a hub 54. The screen 50 further includes a ring 56 between the support ring 40 and the hub 54 that maintains the spokes 52 at the proper position from one another. The spokes 52 are curved inwardly toward the fan blades 36 and shaped to generally complement the shape of the blades as discussed fully below.

The spaces within screen 50 are relatively large with respect to the width of the spokes 52, hub 54 and ring 56 and allow a large volume of air to flow therethrough. In addition to the aesthetic appeal of the screen, the screen also prevents objects such as human extremities or cleaning utensils from contacting the blades of the fan and causing damage to both the fan and the object.

Figure 13:
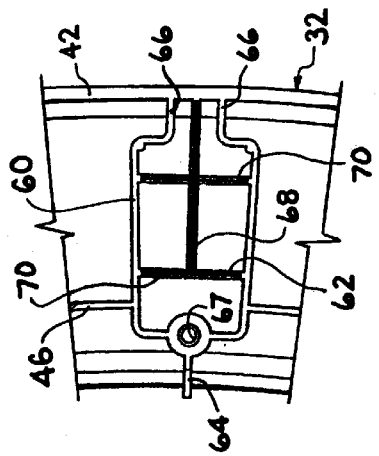
FIG. 13 is an enlarged fragmentary view of a connector of the cover.

As best shown in FIG. 12, the cover 32 includes a number of connectors 58 spaced equally around the circumference of the number base 44. In the preferred embodiment, the cover includes five connectors 58 spaced at 72° intervals around ring 40. With reference to FIGS. 11 and 13, each connector 58 includes a seat 60 and an upstanding plug 62. Seat 60 is generally rectangular. A first rib 64 supports the seat 60 on one side and the seat is supported on the opposite side by a pair of support ribs 66 originating at flange 42. Ridge 46 provides lateral support to either side of the seat 60. Screw receiving apertures 67 are molded in each seat at the point at which the seat is supported by first rib 64. The seat 60 and ribs 64 and 66 have the same height as the ribs 48 and ridge 46 of the cover 32. The plug 62 is disposed within the area defined by seat 60, ribs 66 and flange 42. The plug is comprised of a spine 68 and a pair of cross supports 70 extending roughly twice the distance from ring 40 as the members of seat 60.

Preferably, cover 32 is injection molded from a polystyrene material, but may be formed by other manufacturing methods. Moreover, the specific design of the cover, particularly the screen, may be altered without departing from the scope of the present invention.

Figure 14:
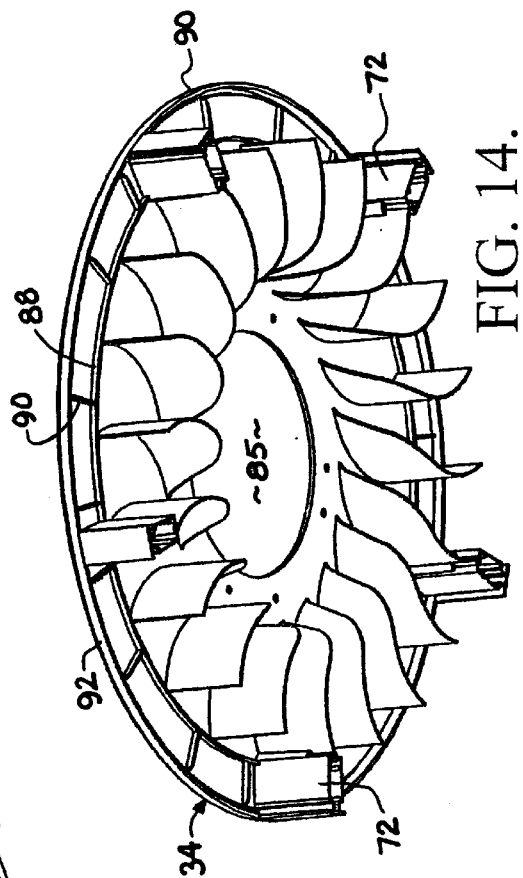
FIG. 14 is an isometric view of the plate of the air filtering device of FIG. 7, viewed from below.
Figure 15:
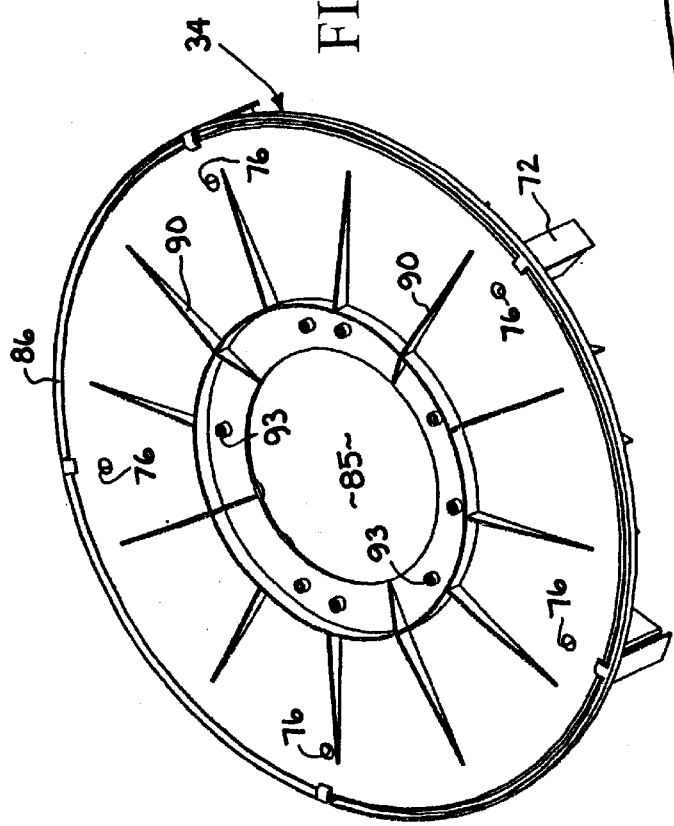
FIG. 15 is an isometric view of the plate, viewed from above.
Figure 18:
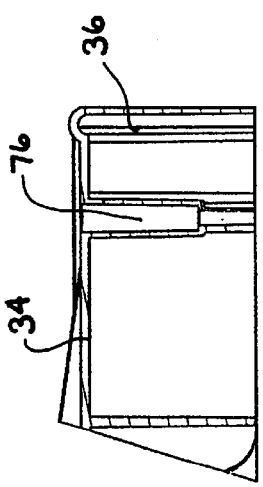
FIG. 18 is a cross-sectional view of one of the legs of the plate taken along line 18—18 FIG. 17.

With reference to FIGS. 9, 14 and 15, plate 34 of this embodiment is shaped to mate with the cover 32. The plate 34 has a number of attachment legs 72 for securing the plate to the cover. With reference to FIGS. 17 and 18, each leg 72 has a neck portion 78 and a pair of opposing sidewalls 74 in parallel relation to one another. Each hollow leg 72 is defined at one end of the sidewalls 74 by the walls of a bore 76 and at the opposing end by an end member 80 capping neck portion 78. End member 80 extends in either lateral direction and is slightly curved to correspond to the curvature of the outer edge of cover 32. The neck portion 78 and end member 80 define a pair of slots 82 extending the length of each leg.

The plate 34 is fixedly secured to the cover 32 by aligning the hollow interior of each leg 72 with the corresponding plug 62 upstanding from cover 32. The ends of spine 68 and cross supports 70 frictionally engage the interior surface of hollow legs 72. When the plugs 62 are placed within legs 72, bores 76 and apertures 67 are axially aligned with one another. As shown in FIGS. 9, 13 and 18, each of a plurality of screws 84 is placed through the bore channel 76 and into the screw receiving apertures 67 in cover 32, and are frictionally threaded within apertures 67 to hold the cover and plate in firm connection with one another.

As best shown in FIG. 16, each blade 36 has a first edge 81 at a first distance from the center of the plate and a second edge 83 at a second distance from the center so that the blades form a ring on the underside of the plate. Preferably, the device has 20 blades. In this embodiment, the angle of curvature of the blades 36 is more tangentially oriented with the center of the plate at each point nearer the axis of rotation. The curvature is best illustrated at either end of the blade with respect to radial lines at that point. At the inner end of the blade, the input angle $\phi$, the angle of the blade at the initial end of the blade with respect to the radial line at that point, is significantly less than the output angle $\theta$, the angle of the blade at the terminal end of the blade with respect to the radial line at that point. Thus, as the blade angle more closely aligns with the radial lines, the blade is more tangential.

For example, if the device is used in conjunction with a 120 volt, single phase, sixty cycle, half ampere, 60 watt ceiling fan motor rotating the device at 200 revolutions per minute, the preferred input angle is about 84° and the preferred output angle is about 24°. Under these conditions, the air velocity vector $\beta$, the direction of air flow at the outer edge of the device with respect to the radial line at that point, is also about 84°. However, the fan blades move such a substantial volume of air at low rotational speeds that the device is effective without the need to optimize each parameter of the blade design for more powerful motors. Thus, since the air filtering device is so efficient, a universal air filtering device effective for all types of residential ceiling fans may be configured according to inexpensive and inefficient motors.

As opposed to the original embodiment, the height of each blade preferably varies along the length of the blade. With reference to FIG. 14, each blade 36 is tapered and slightly concave with respect to the axis of rotation, along the inner portions of each blade. As the blade extends outwardly, the height increases generally linearly at an angle of between 50° and 70° with respect to the plate surface. Before the radial midpoint of the blade, the blade has a convex transition area from the relatively steep angle of increase. After the transition portion, each blade is slightly tapered as the blade extends to the outer edge of each blade. The decorative screen 50, described above, roughly corresponds to the shape of each blade and a small space is defined between each blade 36 and the screen 50.

The shape of each blade 36 advantageously draws air toward the blades and redirects the air through the air filtering media. Specifically, the combination of the blade height and curvature of the progressively curved blades also prevents the misdirection of air below the device and directs a greater volume of air through the filter since more air is forced toward the air filtering element by the portion of the blade closest to the air filtering media.

A retaining ledge 88 is located near the outer edge of the blades 36 and a peripheral flange 92 is formed on the edge of the plate. Between each leg 72, a narrow slit 86 is formed circumferentially along the outer peripheral edge inside flange 92. A plurality of ribs 90 are located between the ledge 88 and the inner edge of the slit 86.

On the upper surface of the plate, a set of screw receiving apertures 93 are located. In the preferred embodiment, the plate is coupled with the rotor plate (not shown) of a conventional ceiling fan motor by a plurality of mounting arms 95 and screws 97. The location of apertures and means for mounting the plate to the motor is discussed in U.S. patent application Ser. No. 09/226,979, now U.S. Pat. No. 6,131,863, herein incorporated by reference. The plate 34 also has a central aperture 85 for receiving a light fixture or other accessory. Furthermore, the upper surface of plate 34 has a support ring 89 and a plurality of ribs 91 extending from either side of the ring. Like the cover, the plate and fan blades are preferably injection molded from polystyrene or a similar material.

With respect to FIGS. 9 and 14, the filtering media 33 is divided into a number of sections corresponding to the number of legs 72. When the cover 32 is attached to the plate 34, the filtering media is placed between the cover 32 and plate 34 near the outer edge 83 of each blade 36. The filtering media rests on support ridge 46 and ribs 48 of cover 32. Retaining ledge 88 on plate 34 prevents the media from moving into the spaces between the blades 34. Once the filtering media 33 is placed in the proper position, one of the doors 38 is placed over the filtering material. As described above, the type of filtering media used may vary depending on the environment in which the device is used. Typically, a carbon or HEPA filter is used.

With reference to FIG. 9, each door 38 has a screen 94, a collar 96 and a flange 98. The screen includes a first set of larger openings 100 and second set of smaller openings 102. The openings are preferably rectangular and the through space defined by the openings is preferably at least 68% of the surface area of the screen 94 of door 38. The doors are also preferably injection molded from polystyrene or a similar thermoplastic material.

The narrow screen 94 is shaped for receipt within slit 86 of plate 34. The edges of screen 94 are slidably received within opposing slots 82 positioned on the neck portion 78 of each leg 72. When the screen is placed fully within the slots 82, the bottom of the screen rests on the cover 32 and the circumferential collar 96 rests on the upper surface of plate 34. Thus, in this embodiment of the air filtering device, the filtering media 33 maybe easily removed by grasping the flange 98 and pulling upwardly on each door to expose the cavity between the cover 32 and plate 34 outside the blades 36.

The effectiveness of the air filtering device will be dictated largely by the power of the ceiling fan motor powering the device. However, the device allows the air to be cleaned efficiently at relatively low rotation speeds due to the blade design and positioning of the filtering media on the outlet side of the forced air means. For instance, the air filtering device rotating at about 193 revolutions per minute and having a carbon filter media processed about 2962 cubic feet per minute of air and at about 220 revolutions per minute processed 3629 cubic feet per minute of air. In another configuration, the device was equipped with a HEPA filter and rotated at 200 revolutions per minute to process about 3219 cubic feet per minute of air and rotated at 239 revolutions per minute to process about 2892 cubic feet per minute of air. As seen by these examples, the air filtering device is effective at all typical speeds of residential fan motors.

With reference to FIGS. 20–24, an industrial embodiment of the air filtering device is generally designated by the numeral 110. Preferably, the device is approximately five feet in diameter and constructed of durable components. The components of the device 30 include an upper plate 112, a lower ring 114; a plurality of fan blades 116, a number of sections of filtering media 118 and an equal number of doors 120.

Figure 20:
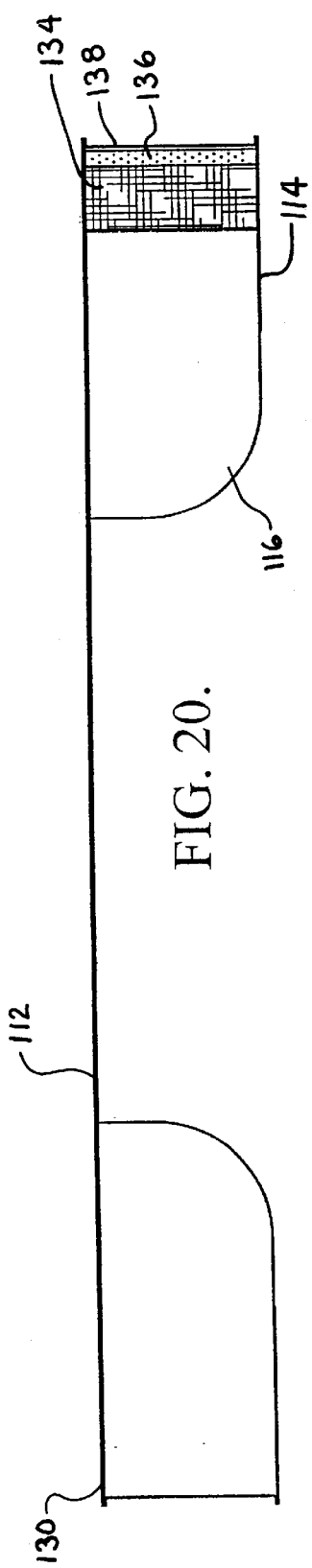
FIG. 20 is a cross-sectional view of the industrial air filtering device.
Figure 21:
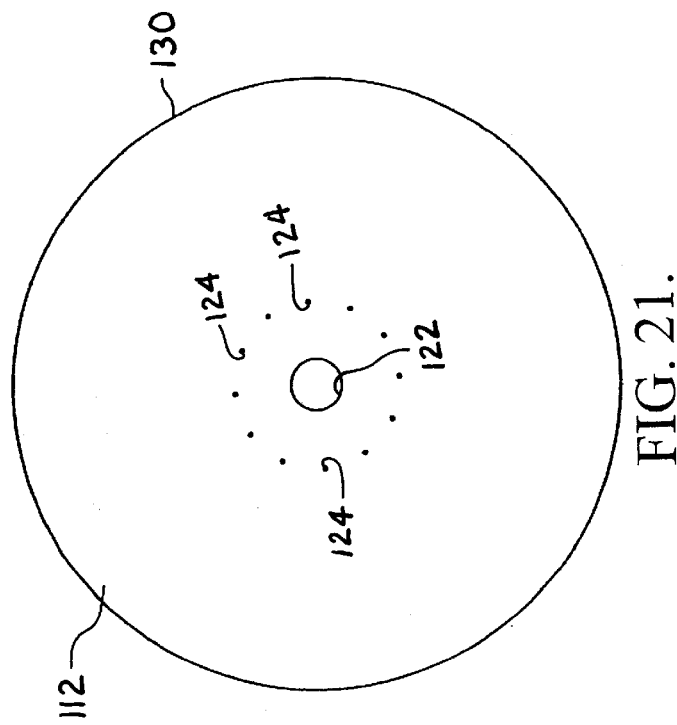
FIG. 21 is a top plan view of the upper plate of the industrial air filtering device.
Figure 22:
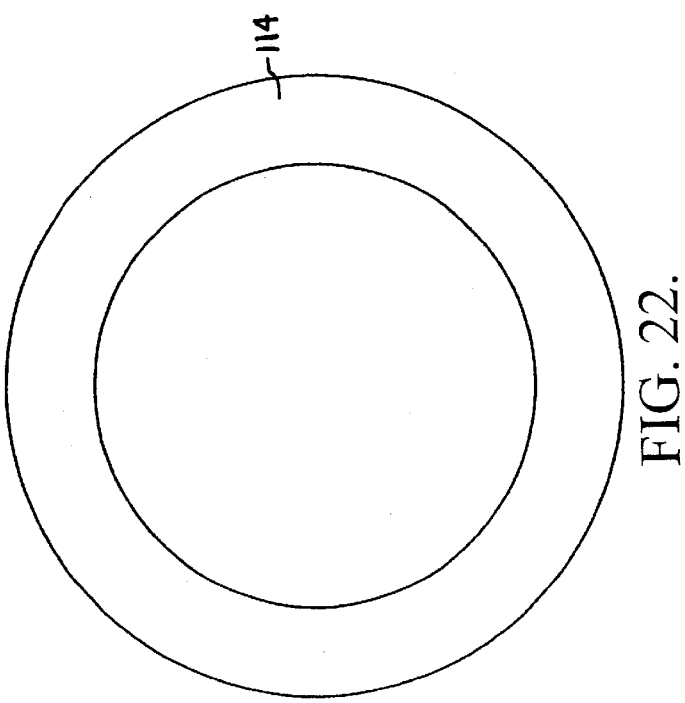
FIG. 22 is a top plan view of the lower ring of the industrial air filtering device.

With reference to FIGS. 20 and 21, the upper plate 112 is generally planar. The plate is preferably made from a low weight aluminum, but may also be formed from a number of other materials such as stainless steel. The plate has a central aperture 122 and a number of screw receiving apertures 124 each spaced at an equal distance from the center of the plate and angularly equidistant from one another. In the preferred embodiment, the portion of upper plate 112 having the apertures 124 is in contact with a rotor plate (not shown) coupled with a rotary motor (not shown). Screws (not shown) are placed through the upper plate 112 through screw receiving apertures 124 and are received within matching apertures in the rotor plate. Accordingly, the pattern of the apertures is dictated by the apertures in the rotor plate. Alternatively, the upper plate may be secured to the rotor plate in accordance with U.S. patent application Ser. No. 09/226,979, now U.S. Pat. No. 6,131,863, previously incorporated by reference.

The fan blades 116 are preferably formed from the same material as the upper plate 112. The metal blades are machined separately from the upper plate and attached to the plate by welding the upper edge of each blade 116 to the lower surface of upper plate 112. The shape of each blade is similar to the shape of the blades in the embodiment depicted in FIGS. 7–18 and described fully above. In the preferred embodiment, the greatest height of the blades is about four inches.

The blades 116 are attached to the upper plate 112 is an annular arrangement to define a central cylindrical space to allow the inflow of air and an annular area at the periphery of the device 110 between the blades and the peripheral edge 130 of upper plate 112. Preferably, the blades are attached to the upper ring by welding or a similar process.

The lower ring 114 has an outer diameter roughly equal to upper plate 112. The inner ring overlaps a significant portion of the blades 116 when the ring 114 is aligned with the upper plate 112. The ring is also preferably formed from aluminum or a similar metal. A number of spacers 132 are welded to the upper plate 112 at the area of the plate between the peripheral edge 130 and the fan blades 116. In the preferred embodiment, four spacers are welded at equal distances from one another. The spacers are the same or slightly greater height than the fans blades. The ring 114 is welded to the opposing end of spacers 132. When the ring 114 is welded into place, a compartment is defined between the plate 112, ring 114, and fan blades 116.

The filtering media 118 is placed within this compartment. In the preferred embodiment, the filtering media is a two-ply material having a first layer 134 of a polyester filter and a second layer 136 of an activated charcoal material. However, the filtering media may vary according to the type of indoor air environment in which the fan is located.

Figure 19:
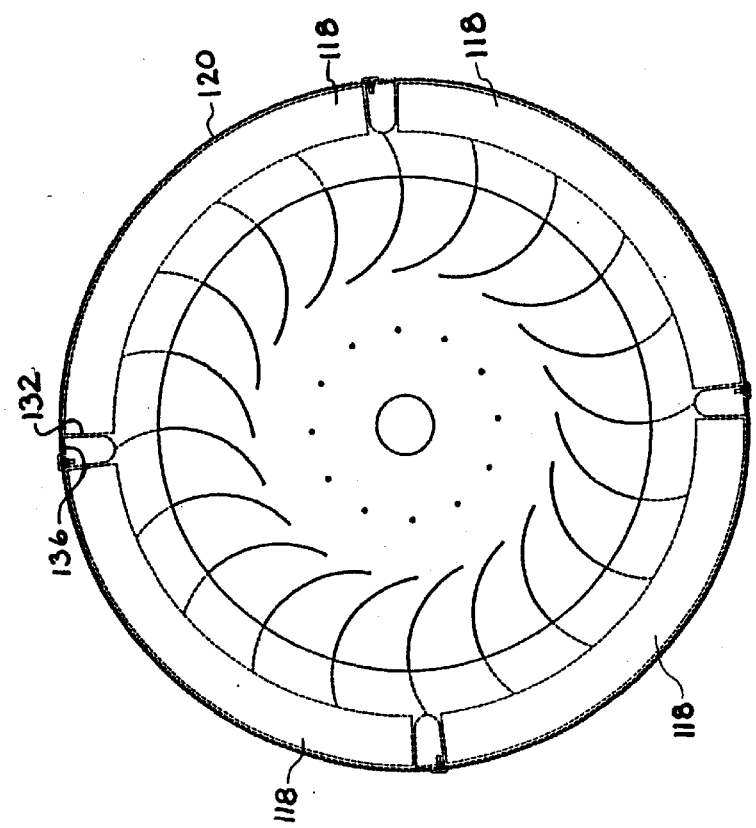
FIG. 19 is a bottom plan view of the industrial air filtering device of the present invention.
Figure 24:
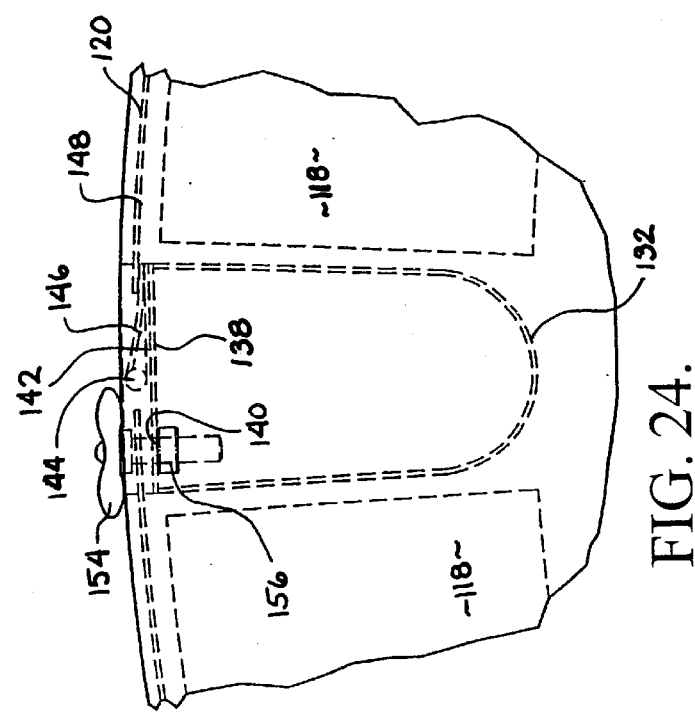
FIG. 24 is an enlarged fragmentary view of the hinged connection between a door of the industrial air filtering device.

With reference to FIGS. 19 and 24, on the open end of each U-shaped spacer 132, a door mount 138 is secured. The door mount is plate-like and extends over the entire length of the open portion of spacer 132. On one side of the door mount 138, an aperture 140 is drilled at the vertical midpoint of the mount. On the other horizontal side of mount 136, the first flap 142 of a hinge 144 is secured to the mount. Preferably, the flap is welded to the mount. The second flap 146 of hinge 144 overlies the first flap 142 and may be pivoted away from the flap. The second flap 146 is welded to the first end 148 of door 120.

Figure 23:
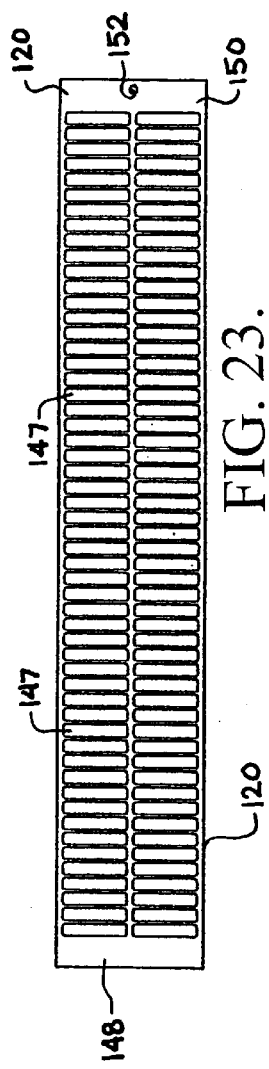
FIG. 23 is a side view of a door of the present invention in a flat, rolled position.

With reference to FIG. 23, the door 120 is shown in greater detail. In the preferred embodiment, each door 120 has a number of spaces 147 formed between first end 148 and second end 150 to allow air to flow freely from the device 110. The doors are also made from aluminum or stainless steel in the preferred embodiment. An aperture 152 is placed within the door 120 at second end 150.

With reference to FIGS. 19 and 24, the door 120 rotates about first end 148 at hinge 144. The opposing end 150 overlaps the doormount 138 of the adjacent spacer 132 so that apertures 140 of the mount and aperture 152 of the door align with one another. A wing nut 154 is placed within the apertures and threaded through a boss 156 positioned on the opposite side of door mount 136. A number of other fasteners may be used that allow the door to be quickly secured or unsecured when the filtering media is changed. For instance, devices utilizing spring loaded knobs that are opened by depressing and swiveling the knob may be used.

The industrial model moves a larger volume of air and may be used in a number of industrial environments. For instance, the device is particularly effective to remove fumes from cleaning solvents, hydrocarbons, acids and paint. Moreover, the device may be used in welding shops to remove dangerous particulates from the air surrounding the workers.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative only, and not in any limiting sense, and it is intended that the invention be given a scope commensurate with the appended claims.

What is claimed is:

1. A ceiling fan comprising:

a motor;

a first ring rotatably coupled with said motor, said first ring having a first side, a second side, an inner edge and a peripheral edge, said first side directed toward said motor, said second side directed away from said motor;

a plurality of curved fan blades each having inner and outer edges, said fan blades coupled with and extending from said second side of said first ring, said blades extending from said peripheral edge of said first ring and annularly disposed to define a central opening between the blades wherein air is pulled toward said blades and directed through a filtering media;

a second ring coupled with said first ring and including first and second sides, said first side directed toward said motor and said second side directed away from said motor; and said filtering media positioned between said second side of said first ring and said first side of said second ring, wherein said filtering media is disposed proximate to said outer edge of said fan blades.

2. The ceiling fan of claim 1 wherein said inner edge of each of said blades is positioned at a first distance from said inner edge of said first ring, and said outer edge of each of said blades is positioned at a second distance from said inner edge of said first ring, wherein said second distance greater than said first distance.

3. The ceiling fan of claim 1 wherein said fan blades extend from said second side of said first ring to said first side of said second ring.

4. The ceiling fan of claim 1 wherein said second ring includes air impelling vanes and a solid outer ring, wherein said vanes are coupled with said outer ring.

5. The ceiling of claim 1 further comprising a plurality of doors extending between said first and second rings to hold said filtering media between said first and second rings.

6. A ceiling fan comprising:

a motor;

a rotatable plate coupled with said motor, said plate having an outer periphery;

means for filtering, said filtering means disposed about the periphery of said plate and rotatable in conjunction with said plate, said filtering means having an inner surface; and means for forcing air, said forcing air means coupled with said plate and disposed in close proximity with said inner surface of said filtering means, said forcing means arranged in a ring defining a central opening so that air is pulled toward forcing means and directed through said filtering means.

\* \* \* \* \*